United States Patent
Ikai et al.

(10) Patent No.: US 9,760,082 B2
(45) Date of Patent: Sep. 12, 2017

(54) MOTOR CONTROL APPARATUS FOR COMPENSATING REVERSE DELAY OF MOTOR

(71) Applicant: FANUC CORPORATION, Yamanashi (JP)

(72) Inventors: Satoshi Ikai, Yamanashi (JP); Tsutomu Nakamura, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 161 days.

(21) Appl. No.: 14/875,755

(22) Filed: Oct. 6, 2015

(65) Prior Publication Data
US 2016/0098031 A1  Apr. 7, 2016

(30) Foreign Application Priority Data
Oct. 7, 2014 (JP) .................................. 2014-206650

(51) Int. Cl.
*G05B 19/402* (2006.01)
*G05B 19/404* (2006.01)
(Continued)

(52) U.S. Cl.
CPC .......... *G05B 19/404* (2013.01); *G05B 19/291* (2013.01); *G05B 2219/41032* (2013.01);
(Continued)

(58) Field of Classification Search
CPC ........ G05B 19/404; G05B 2219/41036; G05B 2219/41078; G05B 2219/41085;
(Continued)

(56) References Cited

U.S. PATENT DOCUMENTS 5,373,220 A * 12/1994 Tomoguchi .......... G05B 19/404
318/568.1
5,895,181 A * 4/1999 Ito ...................... B23Q 11/0003
409/132
(Continued)

FOREIGN PATENT DOCUMENTS

CN 103080859 A 5/2013
CN 103154839 A 6/2013
(Continued)

OTHER PUBLICATIONS

Untranslated Decision to Grant a Patent mailed by Japan Patent Office, Feb. 23, 2016, 3 pages.
(Continued)

*Primary Examiner* — Michael J Brown
(74) *Attorney, Agent, or Firm* — Fredrikson & Byron, P.A.

(57) ABSTRACT

A motor control apparatus includes an error calculation unit which calculates an error between a position of a movable unit and a position of a driven unit, a memory unit which memorizes the error in association with a torque command value as an initial error, and a compensation amountcompensation amount calculation unit which calculates a compensation amountcompensation amount for compensating an elastic deformation amount of an elastic factor between the movable unit and the driven unit. The compensation amountcompensation amount calculation unit calculates the compensation amountcompensation amount based on the initial error held by the memory unit, the torque command value held in association with the initial error, and a torque command value calculated by a torque command calculation unit when a motor rotates reversely.

3 Claims, 6 Drawing Sheets

(51) Int. Cl.
*H02P 6/16* (2016.01)
*H02P 23/24* (2016.01)
*G05B 19/29* (2006.01)

(52) U.S. Cl.
CPC .............. *G05B 2219/41036* (2013.01); *G05B 2219/41071* (2013.01); *G05B 2219/41078* (2013.01); *G05B 2219/41085* (2013.01); *G05B 2219/41208* (2013.01); *G05B 2219/41209* (2013.01); *G05B 2219/41261* (2013.01); *G05B 2219/41394* (2013.01); *G05B 2219/41426* (2013.01); *H02P 6/16* (2013.01); *H02P 23/24* (2016.02)

(58) Field of Classification Search
CPC ........ G05B 19/291; G05B 2219/41071; H02P 23/24; H02P 6/16
USPC .............................................. 700/95, 96, 114
See application file for complete search history.

(56) References Cited

U.S. PATENT DOCUMENTS

| | | | |
|---|---|---|---|
| 6,097,168 A * | 8/2000 | Katoh | ........................... 318/560 |
| 2012/0243956 A1* | 9/2012 | Yamazaki | ............. B23Q 17/22 409/80 |
| 2014/0121818 A1 | 5/2014 | Iwashita et al. | |
| 2014/0197773 A1* | 7/2014 | Ikai | ..................... G05B 19/404 318/630 |

FOREIGN PATENT DOCUMENTS

| | | |
|---|---|---|
| CN | 103792955 A | 5/2014 |
| DE | 102015007132 A1 | 12/2015 |
| JP | 2004234205 A | 8/2004 |
| JP | 2010240827 A | 10/2010 |
| JP | 2014054001 A | 3/2014 |
| WO | 0239574 A1 | 5/2002 |

OTHER PUBLICATIONS

Machine translation of Decision to Grant a Patent mailed by Japan Patent Office, Feb. 23, 2016, 3 pages.
Untranslated Notification of Reasons for Refusal mailed by Japan Patent Office, Dec. 8, 2015, 3 pages.
Machine translation of Notification of Reasons for Refusal mailed by Japan Patent Office, Dec. 8, 2015, 3 pages.
English Abstract and Machine Translation for German Publication No. 10 2015 007 132 A1, published Dec. 17, 2015, 11 pgs.
English Abstract and Machine Translation for Japanese Publication No. 2014-054001 A, published Mar. 20, 2014, 21 pgs.
English Abstract and Machine Translation for Chinese Publication No. 103792955 A, published May 14, 2014, 1 pg.
English Abstract and Machine Translation for Chinese Publication No. 103154839 A, published Jun. 12, 2013, 8 pgs.
English Abstract and Machine Translation for Chinese Publication No. 103080859 A, published May 1, 2013, 14 pgs.
English Abstract and Machine Translation for Japanese Publication No. 2004-234205 A, published Aug. 19, 2004, 17 pgs.
English Translation of Japanese Publication No. 2010240827, published Oct. 28, 2010, 32 pages.
English Translation of Japanese Publication No. 0239574, published May 16, 2002, 19 pages.

* cited by examiner

MOTOR CONTROL APPARATUS FOR COMPENSATING REVERSE DELAY OF MOTOR

BACKGROUND OF THE INVENTION

1. Field of the Invention

The present invention relates to a motor control apparatus for compensating delay when reversing rotation of a motor coupled to a feed axis in a machine tool and an industrial machine and an arm of an industrial robot.

2. Description of the Related Art

A servomotor is coupled to a axis (a machine movable unit), such as a feed axis of a machine tool and an industrial machine and an arm of an industrial robot.

Rotation of the servomotor is converted to straight line motion of a table by a ball screw, and a transmission speed of the servomotor is decelerated by a reduction drive.

Regarding the ball screw or the reduction drive, a difference exists in some cases between a stop position in a positive direction and a stop position in a negative direction with respect to a certain position. Generally, the above-described difference is referred to as a backlash, which causes a decrease in position accuracy.

FIG. 6A to FIG. 6C are drawings illustrating a backlash. In FIG. 6A, a movable unit WA moved by a motor, not illustrated, and a driven unit WB driven by the movable unit WA are illustrated. The movable unit WA includes projections A1 and A2 on both ends and the driven unit WB includes a protrusion B on its center. Thus, for example, when the movable unit WA moves to a right direction, an inner edge of the projection A1 on one end of the movable unit WA engages with one edge of the protrusion B of the driven unit WB. Accordingly, the movable unit WA and the driven unit WB move together to the right direction.

When the motor rotates reversely and the movable unit WA moves from the right direction to a left direction, as illustrated in FIG. 6B, the movable unit WA moves to the left direction. As illustrated in FIG. 6C, when an inner edge of the projection A2 on the other end of the movable unit WA engages with another edge of the protrusion B of the driven unit WB, the movable unit WA and the driven unit WB move together to the left direction.

As described above, when the motor rotates reversely, the movable unit WA needs to move a predetermined moving amount referred to as a backlash before engaging with the driven unit WB. A backlash C illustrated in FIG. 6A and FIG. 6C may cause a decrease in position accuracy. Thus, a compensation amountcompensation amount regarding the backlash C is generated, and the compensation amountcompensation amount is added to a position command of the motor when rotation is reversed.

A machine which performs position control of the driven unit WB based on position information of the motor without acquiring position information of the driven unit WB is a semi-closed controlled machine. The semi-closed controlled machine issues, to the motor, a compensation position command obtained by adding a backlash length to a move command after reversing of a speed command and moves the driven unit WB by an amount of the move command.

A machine which can acquire the position information of the motor and the position information of the driven unit WB both, namely a full-closed controller includes a sensor for the driven unit WB, so that it is only necessary to be provided with a desired value as the move command. In the full-closed controller, the driven unit WB starts moving after the motor has moved by a backlash length when reversing the speed command, and thus delay occurs. Therefore, the full-closed controller may include a speed command compensation function of accelerating the motor after reversing the speed command.

The above-described two techniques perform appropriate compensations at appropriate timings, and compensation amountcompensation amounts and compensation timings are determined in prior to operations. Therefore, these two techniques adopt feedforward control.

On the contrary, according to Japanese Laid-open Patent Publication No. 2014-054001, a position of a motor in a backlash is acquired, and then a backlash compensation amountcompensation amount is determined. In this case, the backlash compensation amountcompensation amount is determined using a current position of the motor in the backlash, so that the technique in Japanese Laid-open Patent Publication No. 2014-054001 adopts feedback control. According to Japanese Laid-open Patent Publication No. 2014-054001, an error between a movable unit and a driven unit when the movable unit engages with the driven unit is regarded as an initial error. A compensation amountcompensation amount is calculated by subtracting an error between the movable unit and the driven unit at current positions from the initial error.

According to Japanese Laid-open Patent Publication No. 2014-054001, a backlash is interpreted a mere gap between tooth faces. However, in normal machines, a backlash is a combination of a mere gap and elastic deformation generated by force acting between the movable unit and the driven unit. In addition, in some machines, there is very little above-described gap, and lost motion based on elastic deformation is dominant. Elastic deformation is generated by torsion of a coupling, especially a resin coupling, coupling the motor and the ball screw and expansion and contraction of the ball screw.

In the case where lost motion based on elastic deformation is caused, when the initial error is calculated in Japanese Laid-open Patent Publication No. 2014-054001, magnitude of a force acting on a backlash end and magnitude of a force necessary for reversing rotation of the motor are different, and there is a possibility that a calculated compensation amountcompensation amount differs from a required compensation amountcompensation amount.

When the compensation amountcompensation amount includes excess or deficiency, shape accuracy of a workpiece is deteriorated. Specifically, if the compensation amount-compensation amount is too small when machining a convex portion of a workpiece, and if the compensation amount-compensation amount is too large when machining a concave portion of the workpiece, a protrusion may be formed on the workpiece. In contrast, if the compensation amount-compensation amount is too large when machining a convex portion of a workpiece, and if the compensation amount-compensation amount is too small when machining a concave portion of the workpiece, a notch may be formed on the workpiece. In particular, when the compensation amount-compensation amount is too large, a notch on a machining surface of the workpiece seems like a scratch, and it is highly likely to be determined as defective machining in the workpiece which is often viewed as a problem.

The present invention is directed to the provision of a motor control apparatus capable of avoiding generation of an excess compensation amountcompensation amount by considering elastic deformation in consideration of the above-described issue.

SUMMARY OF THE INVENTION

In order to achieve the above-described purpose, according to a first aspect of the present invention, a motor control apparatus including a movable unit driven by a motor and a driven unit driven by the movable unit, the motor control apparatus includes a torque command calculation unit command calculation unit configured to calculate a torque command value with respect to the motor, a first position detection unit configured to detect a position of the movable unit, a second position detection unit configured to detect a position of the driven unit, an error calculation unit configured to calculate an error between a first position detection value detected by the first position detection unit and a second position detection value detected by the second position detection unit, a memory unit memory unit configured to memorize the error calculated by the error calculation unit in association with the torque command value as an initial error, and a compensation amountcompensation amount calculation unit configured to calculate a compensation amountcompensation amount for compensating an elastic deformation amount of an elastic factor between the movable unit and the driven unit, wherein the compensation amountcompensation amount calculation unit calculates the compensation amountcompensation amount based on the initial error held by the memory unit memory unit, the torque command value held in association with the initial error, and a torque command value calculated by the torque command calculation unit command calculation unit when the motor rotates reversely.

According to a second aspect of the present invention, in the motor control apparatus according to the first aspect, the compensation amount calculation unit calculates a spring constant of the elastic factor from the initial error held by the memory unit memory unit and the torque command value held in association with the initial error and calculates the compensation amount by subtracting a current error from a value obtained by dividing a torque command value calculated by the torque command calculation unit when the motor rotates reversely by the spring constant.

According to a third aspect of the present invention, in the motor control apparatus according to the first or the second aspect, the memory unit memory unit memorizes the error and the torque command value as the initial error when the movable unit moves while accelerating or at a constant speed.

Objects, features, and advantages of the present invention and additional objects, features, and advantages will become apparent from the following detailed descriptions of exemplary embodiments with reference to the attached drawings.

DETAILED DESCRIPTION

Figure 1:
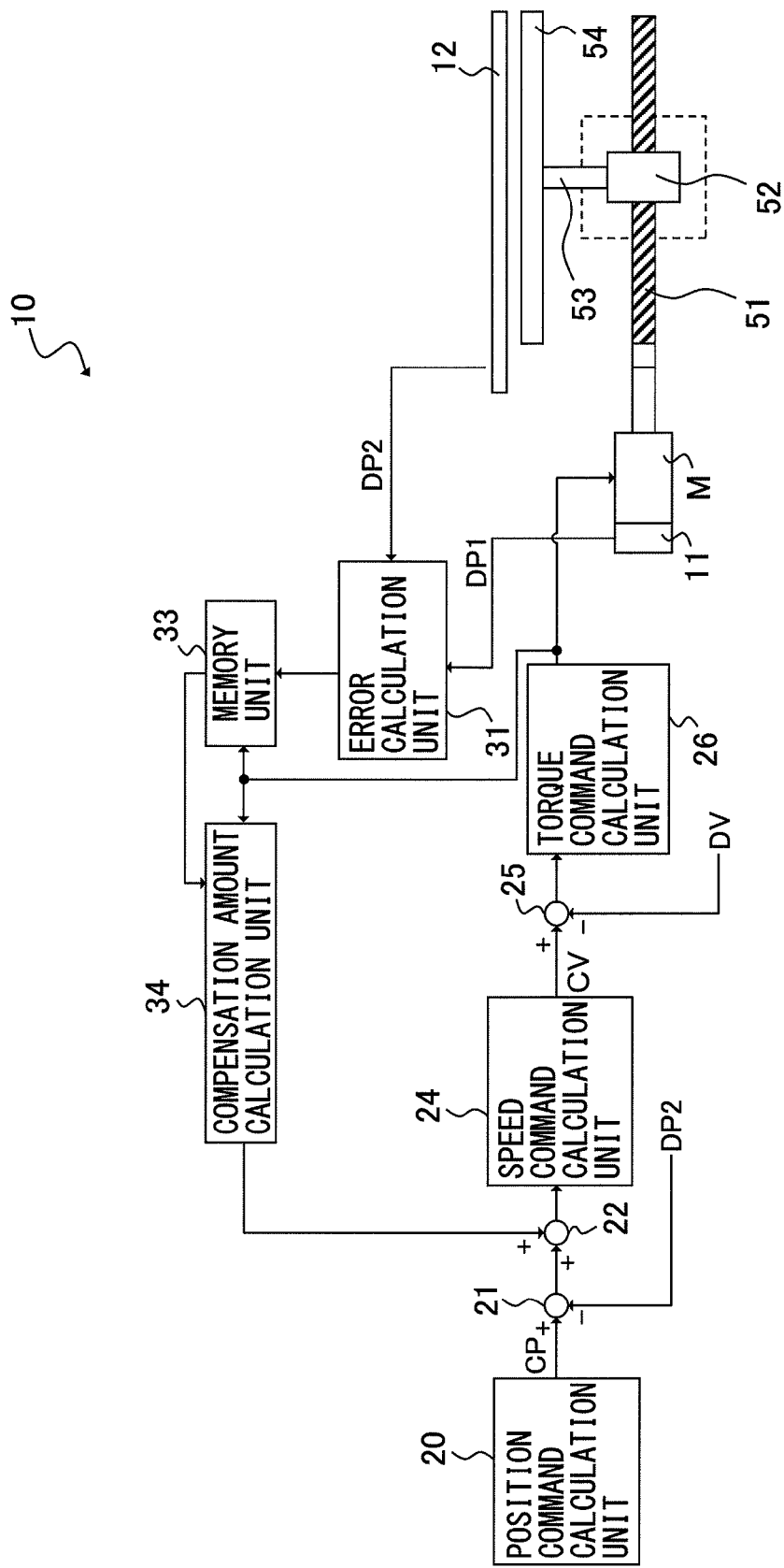
FIG. 1 is a functional block diagram of a motor control apparatus based on the present invention.

Embodiments of the present invention will be described in detail below with reference to the attached drawings. Same components are denoted by the same reference numerals in the drawings. Scales of the drawings have been appropriately changed to facilitate understanding of the present invention.

FIG. 1 is a functional block diagram of the motor control apparatus based on the present invention. As illustrated in FIG. 1, a nut 52 is screwed to a screw 51 of the ball screw mechanism unit mounted on an output axis of a motor M. The nut 52 is coupled to a table 54 via a coupling member 53. A position of the motor M is detected by a first position detector, such as an encoder 11, mounted on the motor M. The encoder 11 also detects a speed detection value DV based on a plurality of continuous positions of the motor M. A position of the table 54 is detected by a second position detector, such as a scale 12, arranged in parallel to the table 54.

Figure 2:
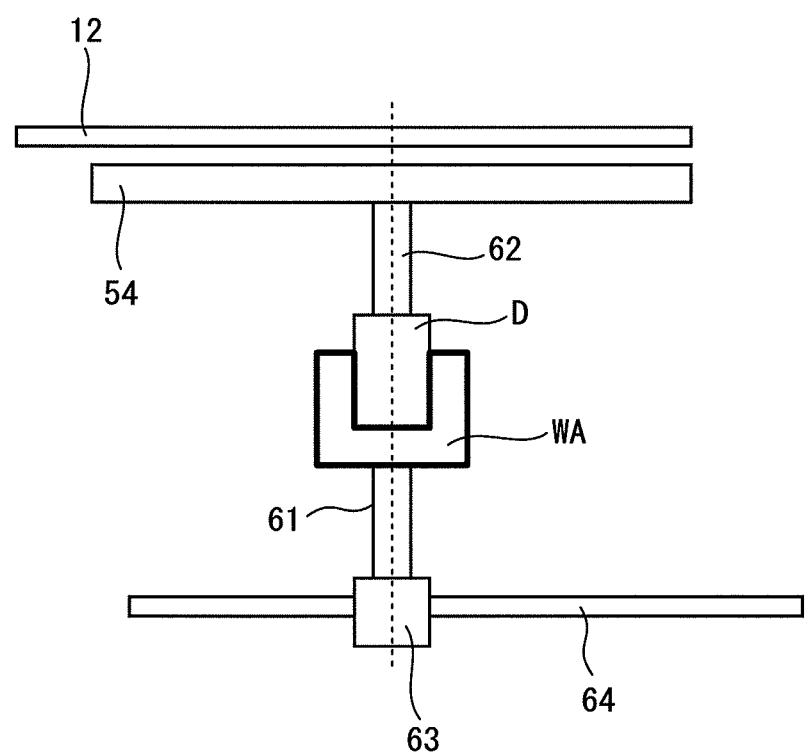
FIG. 2 schematically illustrates a ball screw mechanism unit in FIG. 1.

FIG. 2 schematically illustrates the ball screw mechanism unit in FIG. 1. In FIG. 2, the movable unit WA having an approximately U-shaped cross-section and an engagement member D engaging with the movable unit WA are mainly illustrated. A lower surface of the movable unit WA is coupled to a motor position member 63 indicating a position of the motor M via a first elastic deformation unit 61. The engagement member D is coupled to the table 54 via a second elastic deformation unit 62. In FIG. 2, the engagement member D, the second elastic deformation unit 62, and the table 54 correspond to the driven unit WB.

Figure 3A:
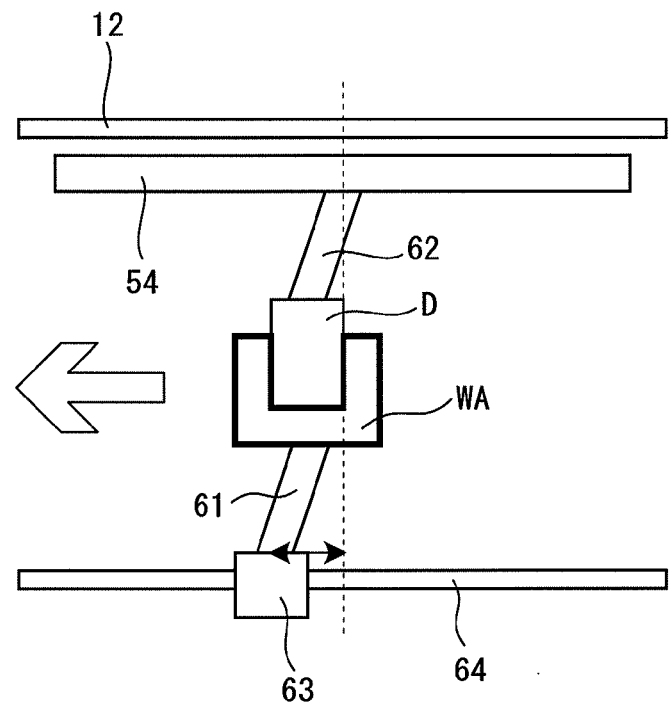
FIG. 3A is a partial schematic diagram illustrating when a movable unit moves to the left direction.
Figure 3B:
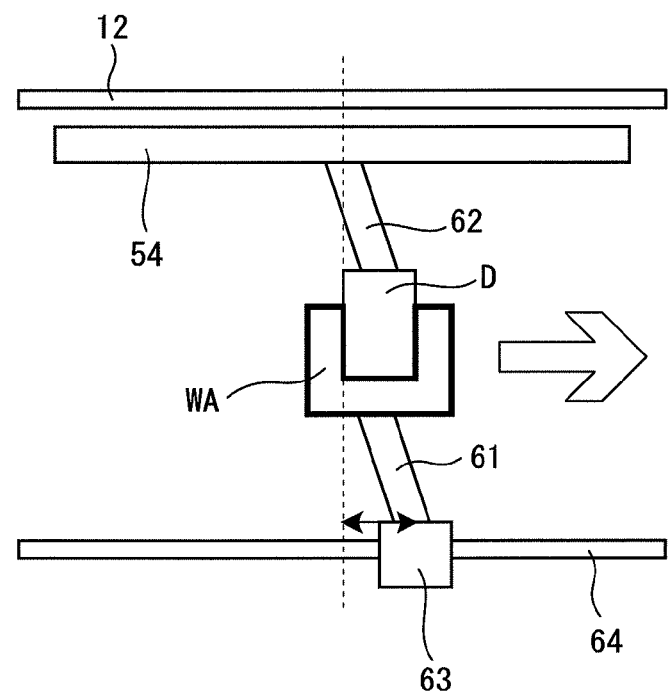
FIG. 3B is a partial schematic diagram illustrating when the movable unit moves to the right direction.

FIG. 3A and FIG. 3B are partial schematic diagrams respectively illustrating when the movable unit moves to the left direction and the right direction. When the motor position member 63 moves to the left direction, the first elastic deformation unit 61 elastically deforms, so that the movable unit WA moves to the left direction slightly later than the motor position member 63.

When the engagement member D engaged with the movable unit WA moves to the left direction, the second elastic deformation unit 62 elastically deforms, so that the table 54 moves to the left direction later than the engagement member D. As illustrated in FIG. 3B, it is basically the same as when the motor position member 63 moves to the right direction, and thus the descriptions thereof are omitted.

As is understood from comparison between FIG. 1 and FIG. 2, the first position detector (encoder) 11 and the motor M in FIG. 1 correspond to a linear actuator 64 which also serves as a linear detector in FIG. 2. In addition, the screw 51 and the nut 52 in FIG. 1 correspond to the movable unit WA, the engagement member D, and the first elastic deformation unit 61 which is elastically deformable. Further, the coupling member 53 in FIG. 1 corresponds to the second elastic deformation unit 62 which is elastically deformable. In the following descriptions, the ball screw mechanism unit in FIG. 1 is described as replaced with the schematic ball screw mechanism unit illustrated in FIG. 2.

With reference to FIG. 1, the motor control apparatus 10 based on the present invention mainly includes a position command calculation unit 20 which periodically calculates a position command value CP for the movable unit WA, a speed command calculation unit 24 which calculates a speed command value for the movable unit WA, and a torque command calculation unit 26 which calculates a torque command value of the motor M.

The motor control apparatus 10 includes an error calculation unit 31 which calculates an error ΔP between a first position detection value DP1 detected by a first position detection unit 11 and a second position detection value DP2 detected by the second position detection unit 12.

The motor control apparatus 10 includes a memory unit 33 which memorizes the error ΔP calculated by the error calculation unit 31 in association with the torque command value as an initial error. The memory unit 33 can memorize other elements such as a speed. Further, the motor control apparatus 10 includes a compensation amount calculation unit 34 which calculates a compensation amount for compensating an elastic deformation amount of an elastic factor between the movable unit WA and the driven unit WB. The elastic factor between the movable unit WA and the driven unit WB is an elastic factor integrated with the first elastic deformation unit 61 and the second elastic deformation unit 62.

Specifically, the compensation amount calculation unit 34 calculates the compensation amount based on the initial error held by the memory unit 33, the torque command value held in association with the initial error, and the torque command value calculated by the torque command calculation unit 26 when the motor rotates reversely.

Figure 4:
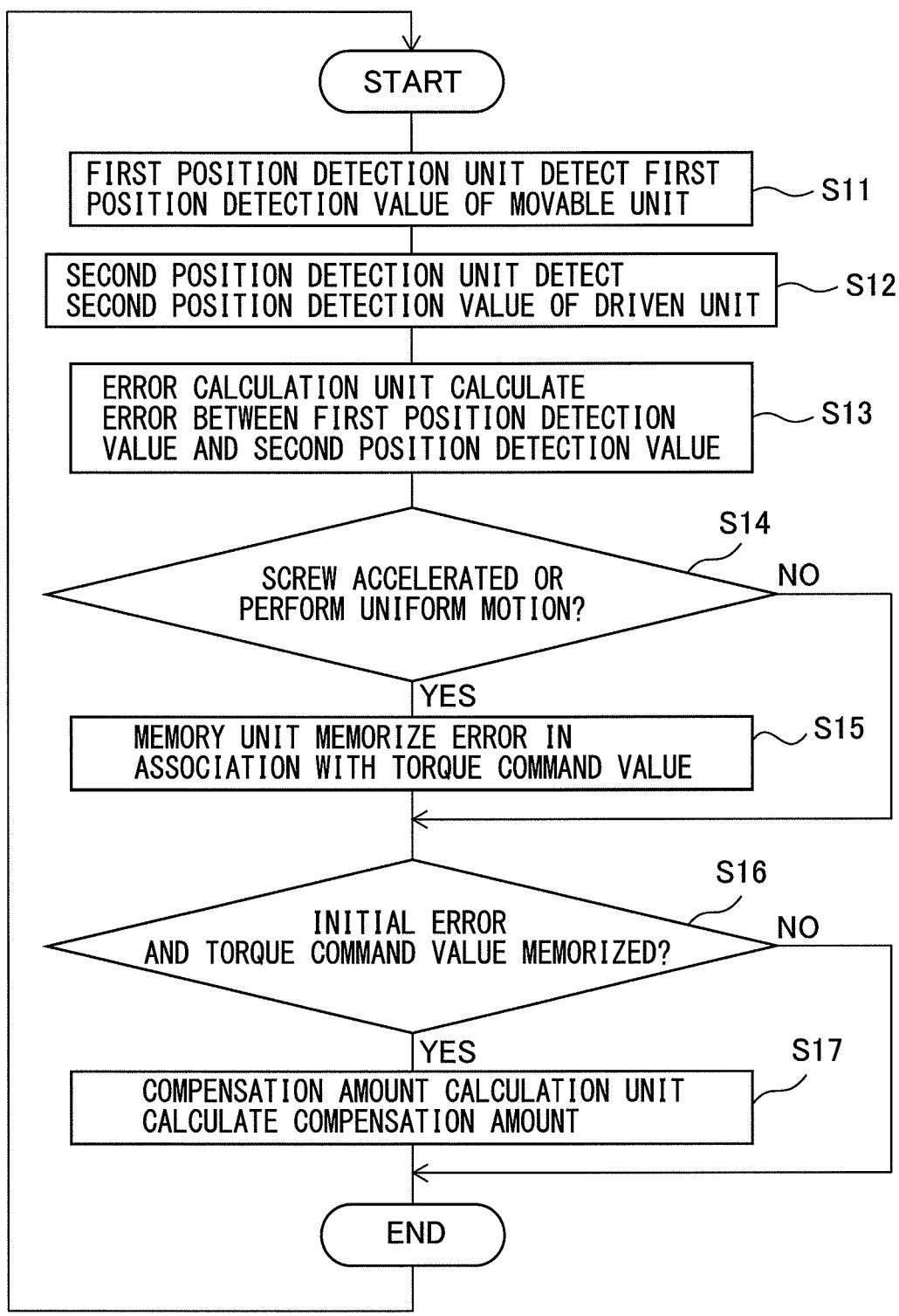
FIG. 4 is a flowchart illustrating operations of the motor control apparatus according to the present invention.

FIG. 4 is a flowchart illustrating operations of the motor control apparatus according to the present invention. Contents illustrated in FIG. 4 are repeated for each predetermined control period. The operations of the motor control apparatus according to the present invention are described below with reference to FIG. 1 to FIG. 4.

First, the position command calculation unit 20 calculates the position command value CP. In steps S11 and S12 in FIG. 4, the first position detection unit 11 and the second position detection unit 12 respectively detect the first position detection value DP1 of the movable unit WA and the second position detection value DP2 of the driven unit WB.

As illustrated in FIG. 4, in step S13, the error calculation unit 31 calculates the error ΔP between the first position detection value DP1 and the second position detection value DP2. As is understood by referring to FIG. 3A and others, the error ΔP corresponds to an elongation amount of a spring when the first elastic deformation unit 61 and the second elastic deformation unit 62 are the elastic factors.

Then, in step S14, it is determined whether the screw 51 is accelerated or performs uniform motion. In other words, it is determined whether the movable unit WA is accelerated or performs uniform motion. It can be determined from the speed command value. When the screw 51 is determined as accelerated or performing uniform motion, the processing proceeds to step S15. In step S15, the memory unit 33 memorizes the error calculated in step S13 in association with the torque command value at that time as the initial error.

When the screw 51 is decelerated, a direction of a force generated by the motor is changed according to a magnitude relationship between a frictional force and a necessary deceleration force. Therefore, a direction of elastic deformation is not unique, and in some cases, the initial error is acquired in association with the torque command value in a state in which elastic deformation, namely both of the initial error and the torque command value scarcely occur. According to the present invention, since the error and the torque command value when the screw 51 is accelerated or performs uniform motion are adopted, at least the initial error corresponding to the frictional force acting on the machine is secured, and an effect of an error of the initial error and an error of the torque command value on the compensation amount is excluded.

Then, in step S16, it is determined whether the initial error and the torque command value are held, and when they are held, the processing proceeds to step S17. In step S17, the compensation amount calculation unit 34 calculates the compensation amount.

Figure 5:
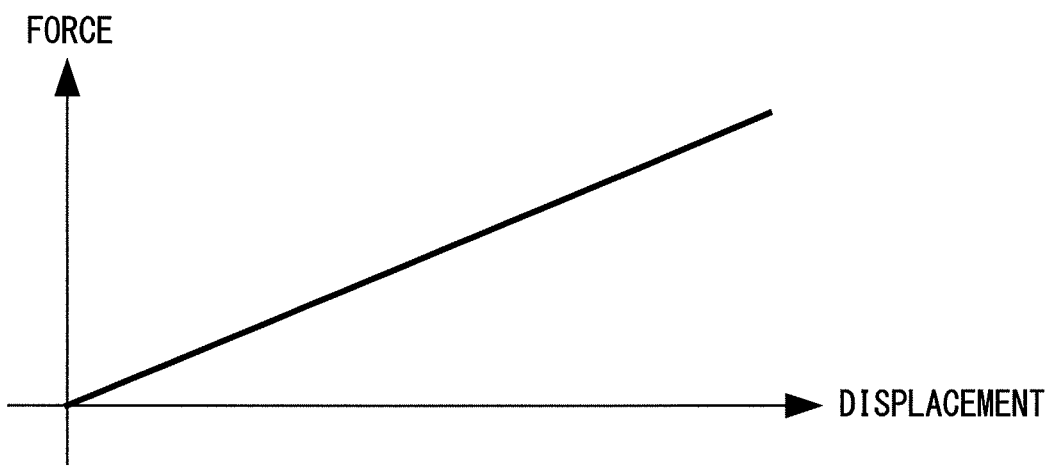
FIG. 5 illustrates a relationship between a displacement of a spring and a force.
Figure 6A:
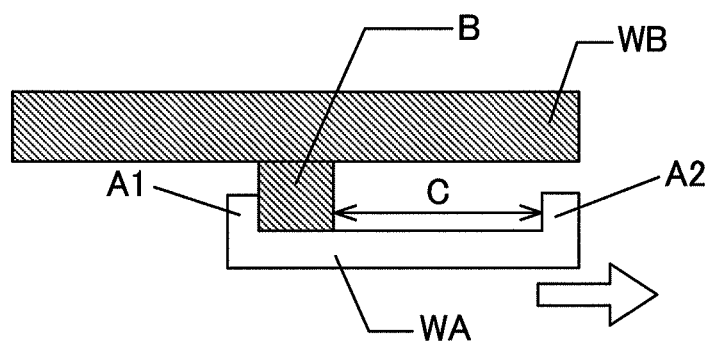
FIG. 6A is a first drawing illustrating a backlash.
Figure 6B:
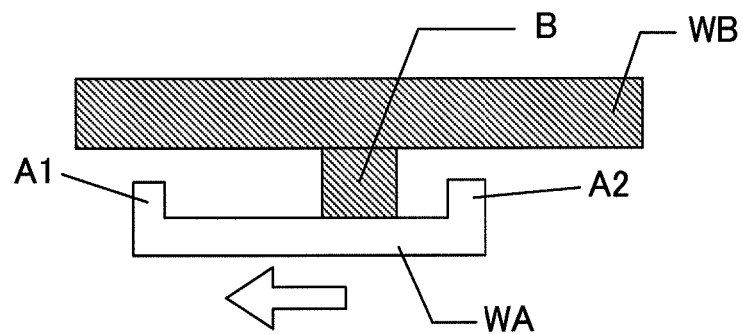
FIG. 6B is a second drawing illustrating a backlash.
Figure 6C:
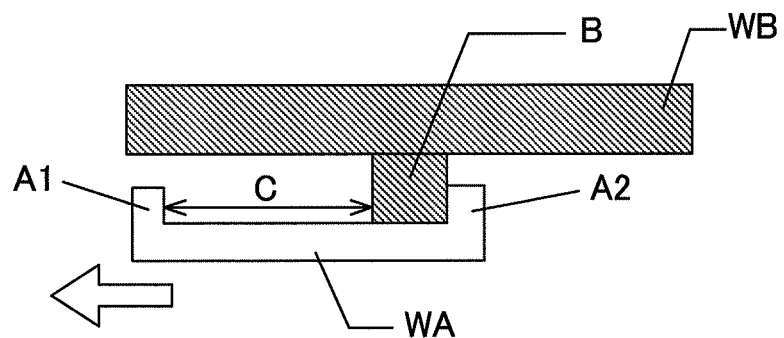
FIG. 6C is a third drawing illustrating a backlash.

FIG. 5 illustrates a relationship between a displacement of a spring and a force. In FIG. 5, an abscissa indicates a total displacement of the first elastic deformation unit 61 and the second elastic deformation unit 62. An ordinate in FIG. 5 indicates a force (torque). As illustrated in FIG. 5, the displacement and the force are in a linear relationship, and an inclination thereof represents a spring constant of the elastic factor integrated with the first elastic deformation unit 61 and the second elastic deformation unit 62.

In step S16, the compensation amount calculation unit 34 calculates the spring constant by dividing the torque command value held in the memory unit 33 by the corresponding initial error. The memory unit 33 may memorize only the spring constant by calculating the spring constant in each predetermined period by dividing the torque command value by the initial error. In this case, a capacity of the memory unit 33 can be reduced.

When the motor M rotates reversely, the compensation amount calculation unit 34 divides the torque command value at the reversing rotation by the spring constant. Needless to say, a reciprocal of the spring constant may be calculated in advance and multiplied by the torque command value. Thus, an appropriate compensation amount corresponding to torque at the reversing rotation can be acquired from a following equation (1).

$$\text{Compensation amount} = (\text{initial error in first direction}/\text{corresponding torque command value in first direction}) \times (\text{current torque command value}) - )\text{current error}) \quad (1)$$

In the equation (1), the term (initial error in first direction/ corresponding torque command value in first direction) is a reciprocal of a spring constant of the above-described elastic factor. The first direction is, for example, the left direction indicated in FIG. 3A, however, it may be the right direction indicated in FIG. 3B.

With reference to FIG. 1 again, a subtractor 21 subtracts the second position detection value DP2 detected by the second position detection unit 12 from the position command value CP calculated by the position command calculation unit 20. The compensation amount calculated by the compensation amount calculation unit 34 is added to the position command value CP by adder 22 and input to the speed command calculation unit 24. The speed command calculation unit 24 calculates a speed command value CV.

The speed detection value DV detected by the first position detection unit 11 is subtracted from the speed command value CV by a subtractor 25 and input to the torque command calculation unit 26. The torque command value calculated by the torque command calculation unit 26 is input to the motor M to drive the motor M.

According to the conventional technique, a compensation amount is calculated using a following equation (2).

$$\text{Compensation amount} = \text{initial error in first direction} - \text{current error} \quad (2)$$

On the contrary, according to the present invention, the spring constant is calculated from the initial error in the first direction and corresponding torque. The compensation amount is calculated using the spring constant according to torque at the reversing rotation.

As described above, according to the present invention, the compensation amount is calculated in consideration of elastic deformation, so that the compensation amount does not become too large. Thus, a workpiece is not excessively machined, and a notch is not formed on a surface of the workpiece. Therefore, the present invention can reduce a likelihood that it is determined as defective machining in the workpiece.

EFFECT OF THE INVENTION

According to the first and the second aspects, the compensation amount is calculated in consideration of elastic deformation, so that the compensation amount does not become too large. Thus, a workpiece is not excessively machined, and a notch is not formed on a surface of the workpiece.

According to the third aspect, a problem that a direction of a force generated by the motor is not uniquely fixed when decelerating can be eliminated. The force generated by the motor when decelerating can be acquired by subtracting frictional force acting on the machine from a force necessary for deceleration. In other words, according to the third aspect of the present invention, a problem that a direction of a force of the motor and a direction of elastic deformation (expansion or contraction) are changed in response to a magnitude relationship between the frictional force and the deceleration force is eliminated. Accordingly, a more accurate elastic deformation model can be provided, and a likelihood that a notch is formed on a surface of the workpiece can be further reduced.

While the present invention has been described with reference to the exemplary embodiment, it will be obvious for a person skilled in the art that various modifications, omission, and addition can be made in addition to the above-described modifications without departing from the scope of the present disclosure.

What is claimed is:

1. A motor control apparatus including a movable unit driven by a motor and a driven unit driven by the movable unit, the motor control apparatus comprising:
    a torque command calculation unit configured to calculate a torque command value with respect to the motor;
    a first position detection unit configured to detect a position of the movable unit;
    a second position detection unit configured to detect a position of the driven unit;
    an error calculation unit configured to calculate an error between a first position detection value detected by the first position detection unit and a second position detection value detected by the second position detection unit;
    a memory unit configured to memorize the error calculated by the error calculation unit in association with the torque command value as an initial error; and
    a compensation amount calculation unit configured to calculate a compensation amount for compensating an elastic deformation amount of an elastic factor between the movable unit and the driven unit,
    wherein the compensation amount calculation unit calculates the compensation amount based on the initial error held by the memory unit, the torque command value held in association with the initial error, and a torque command value calculated by the torque command calculation unit when the motor rotates reversely.

2. The motor control apparatus according to claim 1, wherein the compensation amount calculation unit calculates a spring constant of the elastic factor from the initial error held by the memory unit and the torque command value held in association with the initial error, and
    calculates the compensation amount by subtracting a current error from a value obtained by dividing a torque command value calculated by the torque command calculation unit when the motor rotates reversely by the spring constant.

3. The motor control apparatus according to claim 1, wherein the memory unit memorizes the error and the torque command value as the initial error when the movable unit moves while accelerating or at a constant speed.

* * * * *